United States Patent
Sui et al.

(10) Patent No.: US 12,455,766 B2
(45) Date of Patent: Oct. 28, 2025

(54) IoT NODE COORDINATION

(71) Applicant: International Business Machines Corporation, Armonk, NY (US)

(72) Inventors: Guang Han Sui, Beijing (CN); Peng Hui Jiang, Beijing (CN); Su Liu, Austin, TX (US); Yu Zhu, Beijing (CN); Jun Su, Beijing (CN); Jun Feng Duan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 18/323,505

(22) Filed: May 25, 2023

(65) Prior Publication Data

US 2024/0394095 A1 Nov. 28, 2024

(51) Int. Cl.
*G06F 9/48* (2006.01)
*G16Y 10/40* (2020.01)
*G16Y 40/35* (2020.01)
*G16Y 40/60* (2020.01)

(52) U.S. Cl.
CPC ............ *G06F 9/4881* (2013.01); *G16Y 10/40* (2020.01); *G16Y 40/35* (2020.01); *G16Y 40/60* (2020.01)

(58) Field of Classification Search
CPC ...... G06F 9/4881; G16Y 10/40; G16Y 40/35; G16Y 40/60
See application file for complete search history.

(56) References Cited

U.S. PATENT DOCUMENTS

| | | | | |
|---|---|---|---|---|
| 8,321,870 | B2 * | 11/2012 | Messier | G06F 9/5066 |
| | | | | 709/201 |
| 8,576,772 | B2 | 11/2013 | Cox et al. | |
| 10,489,222 | B2 * | 11/2019 | Sathyanarayana | G06F 9/542 |
| 10,637,142 | B1 * | 4/2020 | Tran | H04W 16/02 |
| 10,659,526 | B2 * | 5/2020 | Khalid | G06F 9/5072 |
| 11,418,597 | B2 * | 8/2022 | Higuchi | G06F 9/5038 |

(Continued)

FOREIGN PATENT DOCUMENTS

CN 118486163 A * 8/2024 ........... G08G 1/0129

OTHER PUBLICATIONS

Coelho et al., "Collaborative Task Processing with Internet of Things (IoT) Clusters," Science and Technologies for Smart Cities, May 22, 2021, Part of the Lecture Notes of the Institute for Computer Sciences, Social Informatics and Telecommunications Engineering book series (LNICST), ,vol. 372, 12 pages. https://link.springer.com/chapter/10.1007/978-3-030-76063-2_21.

(Continued)

*Primary Examiner* — James R Sheleheda
(74) *Attorney, Agent, or Firm* — Yee & Associates, P.C.

(57) ABSTRACT

A computer implemented method performs a task for a vehicle. A number of processor units detects a presence of the vehicle on a road. The number of processor units divides the task to be performed for the vehicle into subtasks. The number of processor units assigns the subtasks to Internet of Things nodes on possible paths that the vehicle can travel on the road. The number of processor units processes the subtasks using a set of the Internet of Things nodes on a selected path in the possible paths in real time as the vehicle moves on the selected path to form subtask results. The number of processor units combines the subtask results from the processed subtasks to form a task result for the task.

20 Claims, 13 Drawing Sheets

(56) References Cited

U.S. PATENT DOCUMENTS

| | | | |
|---|---|---|---|
| 12,039,361 B1* | 7/2024 | Wang | G06F 9/48 |
| 12,250,617 B2* | 3/2025 | Rawat | H04W 76/10 |
| 2008/0238720 A1 | 10/2008 | Lee | |
| 2018/0063261 A1* | 3/2018 | Moghe | G07C 5/008 |
| 2018/0234489 A1 | 8/2018 | Hammons et al. | |
| 2019/0106099 A1 | 4/2019 | Funk et al. | |
| 2019/0266029 A1* | 8/2019 | Sathyanarayana | G06F 9/542 |
| 2020/0257310 A1* | 8/2020 | Du | H04W 4/46 |
| 2021/0081787 A1* | 3/2021 | Qi | G06N 3/047 |
| 2021/0117860 A1* | 4/2021 | Ergen | G06F 9/5072 |
| 2021/0185492 A1* | 6/2021 | Higuchi | H04W 4/40 |
| 2021/0321324 A1* | 10/2021 | Badic | H04W 4/80 |
| 2021/0400770 A1* | 12/2021 | Liu | G06F 9/5033 |
| 2022/0032933 A1* | 2/2022 | Wang | B60W 50/06 |
| 2022/0070699 A1 | 3/2022 | Thiyagarajan et al. | |
| 2022/0114010 A1* | 4/2022 | Guim Bernat | G06F 9/45558 |
| 2022/0210686 A1* | 6/2022 | Zhang | H04L 41/0833 |
| 2022/0309911 A1 | 9/2022 | Clifford | |
| 2023/0094709 A1* | 3/2023 | Dai | H04W 4/40 370/310 |
| 2023/0110300 A1* | 4/2023 | Lei | B60W 60/0023 701/25 |
| 2023/0180092 A1* | 6/2023 | Kang | H04W 4/44 370/331 |
| 2024/0025453 A1* | 1/2024 | Kundu | G01C 21/34 |
| 2024/0039785 A1* | 2/2024 | Ucar | H04L 67/12 |
| 2024/0118096 A1* | 4/2024 | Kundu | B60L 53/12 |
| 2024/0160269 A1* | 5/2024 | Jha | G08G 1/0116 |
| 2024/0208542 A1* | 6/2024 | Wang | B60W 60/0023 |
| 2024/0231906 A1* | 7/2024 | Jiang | G06F 9/4893 |
| 2024/0289165 A1* | 8/2024 | Wang | G06F 9/4875 |
| 2024/0354155 A1* | 10/2024 | Xu | G06F 9/4881 |
| 2024/0394095 A1* | 11/2024 | Sui | G06F 9/4881 |
| 2024/0414337 A1* | 12/2024 | Kundu | H04N 19/12 |
| 2025/0045108 A1* | 2/2025 | Chen | G06F 9/5027 |

OTHER PUBLICATIONS

Ng et al., "Road traffic monitoring using a wireless vehicle sensor network," 2008 International Symposium on Intelligent Signal Processing and Communication Systems (ISPACS2008), Feb. 8-11, 2009, Bangkok, Thailand, 4 pages. https://ieeexplore.ieee.org/abstract/document/4806673.

Hewon Cho et al: "Energy-efficient Cooperative Offloading for Edge Computing-enabled Vehicular Networks", arxiv.org, Cornell University Library, 201 Olin Library Cornell University Ithaca, NY 14853, [Online] Nov. 1, 2021 (Nov. 1, 2021), XP091090835, DOI: 10.48550/arXiv.2111.00715 Retrieved from the Internet: URL:https://arxiv.org/pdf/2111.00715> [retrieved on Jul. 18, 2024].

PCT International Search Report and Written Opinion, dated Sep. 2, 2024, regarding Application No. PCT/IB2024/054176, 10 pages.

* cited by examiner

IoT NODE COORDINATION

BACKGROUND

The disclosure relates generally to an improved computer system and more specifically to analyzing vehicle data using Internet of Things (IoT) nodes along a road.

Internet of Things (IoT) nodes are increasingly being used to collect and process data about vehicles on the road. Internet of Things nodes used to collect data about vehicles can be placed in a number of different locations. For example, an Internet of Things node can be a computer in a vehicle, a traffic light, a road sign, the road, a roadside unit, or other type of object that can receive and transmit data.

These and other types of Internet of Things nodes can collect data from vehicles for processing as the vehicles travel on the road. This data can be processed to determine various attributes about the vehicle. For example, from the information collected from the Internet of Things nodes, the data can be processed to determine various attributes about the vehicle or the environment around the vehicle. These attributes include vehicle speed, acceleration, location, vehicle health, environmental conditions, driver behavior and safety, or other attributes.

This information can be used to perform actions such as optimizing vehicle performance in fuel efficiency, identifying optimal routes for travel, reducing congestion, changing timings of traffic lights to optimize traffic flow, suggesting maintenance, changing vehicle attributes to increase performance, and other actions. These actions can be tailored for the particular road, vehicle on the road, or groupings of vehicles on the road. In some cases, the actions can be adjustments to attributes for particular vehicles, suggesting different routes, or controlling the operation of the vehicle.

The data collected by the Internet of Things nodes can be sent to one or more locations for processing. In other examples, this data can be in a cloud-based data processing system, a central computer, or other location. This data can also be processed by the Internet of Things nodes collecting the data from vehicles on the road. As a result, Internet of Things nodes play an important role in collecting and processing data about vehicles on the road to improve vehicle performance and road usage. Processing this data in real-time or as quickly as possible to form actions with respect to vehicles on the road can be more difficult than desired.

SUMMARY

According to one illustrative embodiment, a computer implemented method for performs a task for a vehicle. A number of processor units detects a presence of the vehicle on a road. The number of processor units divides the task to be performed for the vehicle into subtasks. The number of processor units assigns the subtasks to Internet of Things nodes on possible paths that the vehicle can travel on the road. The number of processor units processes the subtasks using a set of the Internet of Things nodes on a selected path in the possible paths in real time as the vehicle moves on the selected path to form subtask results. The number of processor units combines the subtask results from the processed subtasks to form a task result for the task. According to other illustrative embodiments, a computer system and a computer program product for performing a task are provided. As a result, the illustrative embodiments can provide a technical effect of increasing the performance in collecting and analyzing data for vehicles in real time.

The illustrative embodiments can permissively assign the subtasks to the Internet of Things nodes on the possible paths that the vehicle can travel on the road based on node processing resources in the Internet of Things nodes and needed processing resources for processing individual subtasks in the subtasks. As a result, the illustrative embodiments can provide a technical effect of increasing the performance in collecting and analyzing data for vehicles in real time by matching Internet of Things node resources with resources needed for subtasks.

The illustrative embodiments can permissively assign the subtasks to the Internet of Things nodes on the possible paths that the vehicle can travel on the road such that the subtasks are performed on the selected path in the possible paths used by the vehicle and select a group of the Internet of Things nodes assigned the subtasks on the selected path to process the subtasks in response to the vehicle traveling on the selected path. As a result, the illustrative embodiments can provide a technical effect of increasing the performance in collecting and analyzing data for vehicles in real time through assigning the subtasks to Internet of Things nodes on each of the possible paths before the vehicle travels on the selected path.

The illustrative embodiments an Internet of Things node on the selected path assigned a plurality of subtasks in the subtasks can permissively reassign a portion of the plurality of subtasks to a set of subsequent Internet of Things nodes on the selected path. Thus, the illustrative embodiments can provide a technical effect of increasing the performance in collecting and analyzing data for vehicles in real time through reassigning subtasks as needed to one or more subsequent Internet of Things nodes reducing the occurrence of unprocessed subtasks.

The illustrative embodiments can permissively complete a set of the subtasks using a number of backup Internet of Things nodes in response to an Internet of Things node being unable to complete the set of the subtasks. As a result, the illustrative embodiments can provide a technical effect of increasing the performance in collecting and analyzing data for vehicles in real time through using backup Internet of Things nodes when an Internet of Things node is unable to complete the set of subtasks.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
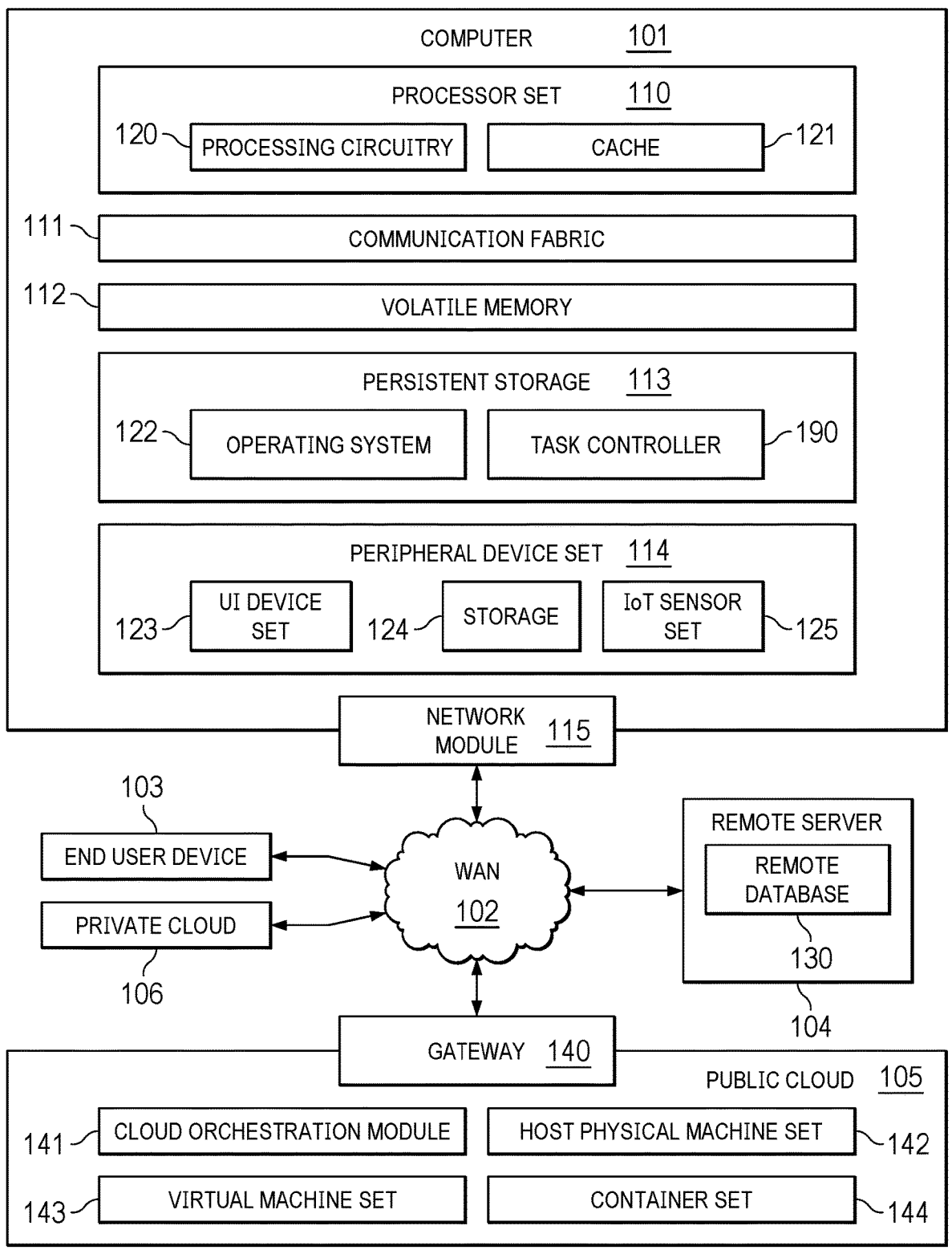
FIG. 1 is a block diagram of a computing environment in accordance with an illustrative embodiment.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as task controller 190. In this example, task controller 190 controls the processing of tasks performed relating to vehicles using Internet of Things nodes located along roads on which the vehicles travel. In addition to task controller 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and task controller 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in task controller 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in task controller 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative examples recognize and take into account a number of different considerations as described herein. For example, illustrative examples recognize and take into account that it is desirable to distribute the processing of data rather than processing the data centrally. In one illustrative example, a task can be performed for a vehicle on a road. This task can be, for example, determining attributes for a vehicle such as driver condition, vehicle overload detection, and plate protection. An Internet of Things device on the side of a highway can detect the vehicle and initiate processing of the task. This task can be difficult to form by a single Internet of Things device for a number of reasons. For example, the amount of processing resources in a single Internet of Things node can be insufficient to perform all of the analysis for the task. Further, the cost of installing an Internet of Things node at different points on the highway with sufficient processing resources can be expensive. Additionally, a single point of failure is present with a single Internet of Things node being assigned to process the task for a vehicle detected at a particular location.

One solution involves adding additional Internet of Things nodes at a key location for performing tasks. These Internet of Things nodes in each perform a portion of the task for a vehicle. However, adding additional Internet of Things nodes at key locations for performing the task for vehicles can be inefficient. This addition of Internet of Things nodes to a location can form a bottleneck. For example, a power failure can result in an inability of the Internet of Things nodes to form the task. Additionally, the use of additional or sufficient numbers of Internet of Things nodes can be impractical with some parts of the road not being monitored by sufficient numbers of Internet of Things nodes.

Thus, illustrative examples provides a computer implemented method, apparatus, system, and computer program product for processing tasks for vehicles is provided. In illustrative examples, some Internet of Things nodes can work together to perform a task. In other words, cooperation can occur in performing a task in which the workload for a task performed for a vehicle in the road can be balanced between the Internet of Things nodes. Further, in the illustrative examples, the Internet of Things nodes do not need to be placed in a single location. Instead, the Internet of Things nodes can be distributed along the road.

Figure 2:
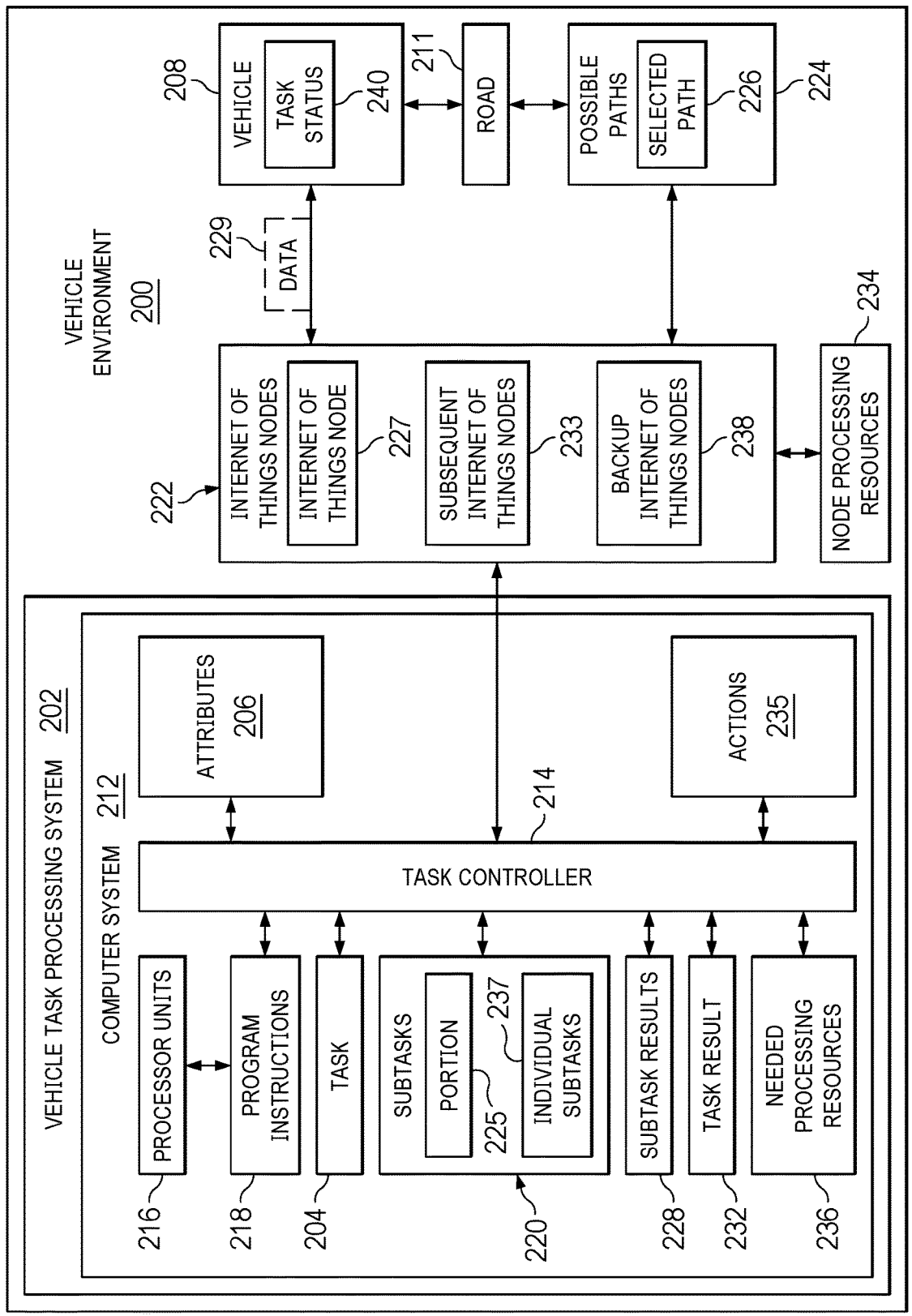
FIG. 2 is a block diagram of a vehicle environment in accordance with an illustrative embodiment.

With reference now to FIG. 2, a block diagram of a vehicle environment is depicted in accordance with an illustrative embodiment. In this illustrative example, vehicle environment 200 includes components that can be implemented in hardware such as the hardware shown in computing environment 100 in FIG. 1.

In this illustrative example, vehicle task processing system 202 can perform task 204 for vehicle 208. In this example, task 204 can be performed to determine a set of attributes 206 for vehicle 208. As used herein, a "set of" when used with reference items means one or more items. For example, a set of attributes 206 is one or more of attributes 206. The set of attributes 206 for vehicle 208 can include attributes about vehicle 208, occupants in vehicle 208, objects carried by vehicle 208, the environment around vehicle 208, or other items. In this illustrative example, the set of attributes 206 can be at least one of a vehicle speed, an acceleration, a location, a vehicle health, an environmental condition, a driver behavior, a driver health, a passenger health, a safety condition, a vehicle loading, a driver condition, a registration number check, or other attributes.

In this example, vehicle 208 can take a number of different forms. For example, vehicle 208 can be selected from a group comprising an automobile, a sports car, a sport utility vehicle, a truck, a van, a semi-trailer truck, an autonomous truck, an autonomous car, a motorcycle, a self-driving vehicle, and other types of vehicles.

In this illustrative example, vehicle task processing system 202 comprises a number of different components. As depicted, vehicle task processing system 202 comprises computer system 212 and task controller 214. Task controller 214 is located in computer system 212.

Task controller 214 can be implemented in software, hardware, firmware or a combination thereof. When software is used, the operations performed by task controller 214 can be implemented in program instructions configured to run on hardware, such as a processor unit. When firmware is used, the operations performed by task controller 214 can be implemented in program instructions and data and stored in persistent memory to run on a processor unit. When hardware is employed, the hardware can include circuits that operate to perform the operations in task controller 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations. Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, task controller 214 can analyze data 229 for vehicle 208. This analysis of data 229 can be performed to determine a set of attributes 206 for vehicle 208. In this example, the process begins by detecting the presence of vehicle 208 on road 211. Road 211 can take a number of different forms. For example, road 211 can be one selected from a group comprising of a highway, a freeway, a toll road, a street, an avenue, a feeder road, an access road, and other type of roads. Some roads may have traffic lights lines, or other signs or devices to control the flow of traffic.

The presence of vehicle 208 can be detected in a number of different ways. For example, the presence can be detected using sensors associated with road 211. In other examples, the presence of vehicle 208 can be detected from vehicle 208 transmitting location information indicating that vehicle 208 is on road 211. For example, if vehicle 208 has a radio frequency identifier (RFID) chip, radio frequency identifier sensors can be used to detect the presence of vehicle 208. For example, a radio frequency identifier chip can be present in toll tags commonly used by vehicles. In another example, vehicle 208 can broadcast its presence or establish communication with an Internet of Things node using radio frequency signals such as cellular signals, Bluetooth signals, or other suitable signals.

In this example, task controller 214 divides task 204 to be performed for vehicle 208 into subtasks 220. Task controller 214 assigns subtasks 220 to Internet of Things nodes 222 on possible paths 224 that vehicle 208 can travel on road 211. In this illustrative example, the assignment of subtasks 220 can be formed in a number of different ways.

For example, task controller 214 can assign subtasks 220 to Internet of Things nodes 222 on possible paths 224 that vehicle 208 can travel on road 211 based on node processing resources 234 in Internet of Things nodes 222 and needed processing resources 236 for processing for individual subtasks 237 in subtasks 220. In other words, some of Internet of Things nodes 222 may receive particular subtasks based on needed processing resources 236. Additionally, one Internet of Things node can receive multiple subtasks while another Internet of Things node receives a single subtask based on node processing resources 234 available in each of the Internet of Things nodes 222.

In this depicted example, road 211 can have more than one path when a branch is present in road 211. For example, the branch in road 211 can be for two or more paths that vehicle 208 can select. In this example, road 211 can have many branches. The different paths that can be traveled from the branches are possible paths 224 for vehicle 208. Possible paths 224 can be determined for some distance or number of branches along the road 211 from the location of vehicle 208.

Further, task controller 214 assigns subtasks 220 to Internet of Things nodes 222 on possible paths 224 that vehicle 208 can travel on road 211 such that subtasks 220 are performed on selected path 226 in possible paths 224 used by vehicle 208. In other words, task controller 214 can assign subtasks 220 to Internet of Things nodes 222 on each of possible paths 224. With this assignment, a group of Internet of Things nodes 222 is present to process subtasks 220 for any path in possible paths 224 that vehicle 208 takes.

Task controller 214 selects a group of Internet of Things nodes 222 assigned subtasks 220 on selected path 226 to process subtasks 220 in response to vehicle 208 traveling on selected path 226. In this example, Internet of Things nodes 222 on other paths and possible paths 224 not taken by vehicle 208 do not process subtasks 220. These Internet of Things nodes can receive a notification indicating that these nodes no longer needed to be available to process subtasks 220.

In one illustrative example, Internet of Things node 227 on selected path 226 is assigned a plurality of subtasks 220 in the subtasks. In other words, Internet of Things node 227 can be assigned two or more of subtasks 220. In this example, task controller 214 can reassign a portion 225 of the plurality of subtasks 220 to a set of subsequent Internet of Things nodes on selected path 226. The set of subsequent Internet of Things nodes 233 on selected path 226 can be one or more subsequent nodes down selected path 226 after the Internet of Things node 227.

This reassignment of portion 225 of the plurality of subtasks 220 can be performed for a number of different reasons. For example, Internet of Things node 227 can determine that it is unable to complete processing of the plurality of subtasks 220 within a desired amount of time. For example, Internet of Things node 227 may not be able to process any of the plurality of subtasks 220 by the time vehicle 208 reaches the next Internet of Things node on selected path 226. In another example, Internet of Things node 227 may have completed some of the plurality of subtasks 220 but does not have processor resources available to complete processing of the portion of the plurality of subtasks 220.

Task controller 214 processes subtasks 220 by a set of Internet of Things nodes 222 on selected path 226 in possible paths 224 in real time as vehicle 208 moves on selected path 226 to form subtask results 228. In this example, processing in real time means that subtasks 220 are processed as quickly as possible without any intentional delay or lag. The process combines subtask results 228 to form task result 232 for task 204.

In this illustrative example, the processing of subtasks 220 can be performed using data 229. Data 229 can be received from vehicle 208 as vehicle 208 establishes communications with Internet of Things nodes 222. These communications can be established using wireless communications protocols. In the illustrative example, these different protocols can include cellular, Wi-Fi, Bluetooth, Zigbee, and other suitable protocols. Wi-Fi is a family of wireless network protocols based on the IEEE 802.11. Bluetooth is a short-range wireless technology standard that is used for exchanging data between fixed and mobile devices over short distances. Zigbee is an IEEE 802.15.4-based specification for a suite of high-level communication protocols.

In one illustrative example, an Internet of Things node in Internet of Things nodes 222 on selected path 226 completes a subtask in subtasks 220 before or as the vehicle passes a next Internet of Things node in Internet of Things nodes 222 on selected path 226. In this example, a subtask result from processing the subtask is reported in response to completing the subtask. The completion can be reported from the Internet of Things node completing the subtask to the next Internet of Things node on the selected path.

This reporting can be a direct reporting in which the Internet of Things node completing the subtask directly sends the subtask result to the next Internet of Things node. In another illustrative example, the reporting can be indirect in which a report from the Internet of Things node completing the subtask is sent to task controller 214.

In turn, task controller 214 can send the status to the next Internet of Things node. In this example, the subtask result can indicate that the subtask was completed. This subtask result can also include values or other information resulting from processing subtask.

Further, Internet of Things nodes 222 can include a number of backup Internet of Things nodes 238. As used herein, a "number of" when used with reference items means one or more items. For example, a number of backup Internet of Things nodes 238 is one or more of backup Internet of Things nodes 238. In this example, a set of subtasks 220 can be completed using a set of backup Internet of Things nodes 238 in response to Internet of Things node 227 being unable to complete the set of subtasks 220.

In this illustrative example, task controller 214 can record task status 240 for subtasks 220. In one illustrative example, task status 240 can be recorded after the completion of subtasks 220. In another example, task status 240 can be recorded as subtasks 220 are being processed. In this manner, a current status of the processing of subtasks 220 can be identified task status 240. In one illustrative example, task status 240 can be recorded in vehicle 208. With this example, vehicle 208 can receive individual status from Internet of Things nodes 222 processing subtasks 220 on selected path 226. The collection of the status of subtasks 220 can occur as vehicle 208 passes Internet of Things nodes 222 on selected path 226 assigned to process subtasks 220.

Task controller 214 can perform the set of actions 235 using task result 232 for task 204. In this example, the set of actions can take a number of different forms. For example, the set of actions can be selected from at least one of changing a route for vehicle 208, changing a route for another vehicle, changing a throttle position to change performance, suggesting a load change to vehicle 208, changing a traffic light timing, suggesting a different speed, controlling operation a group of autonomous vehicles, logging task result 232 in a database, sending a notification, generating an alert to an operator of vehicle 208, or other suitable actions. As used herein, a "group of" when used with reference items means one or more items. For example, a group of autonomous vehicles is one or more autonomous vehicles.

Thus, illustrative examples can identify subtasks from a task for a vehicle traveling on the road. The processing of the subtasks can be assigned to Internet of Things nodes on different paths and the assignment can be performed by many Internet of Things nodes to reduce latency and a need for greater processing power in the Internet of Things nodes. With distribution of subtasks between Internet of Things nodes, parallel processing of subtasks can occur and can reduce the impact on use of processing resources along the road.

In one illustrative example, one or more solutions are present that overcome a problem with performing tasks for vehicles traveling on road. As a result, one or more solutions provide an ability to efficiently process tasks for a vehicle on a road even when multiple paths are present on the road. In the illustrative examples, a task can be provided to the subtasks that are assigned to Internet of Things nodes that are located along the different paths on the road. The subtasks are performed by the Internet of Things nodes on the path actually taken by the vehicle. The other Internet of Things nodes on other paths do not process those subtasks in a release to perform other processing.

Computer system 212 can be configured to perform at least one of the steps, operations, or actions described in the different illustrative examples using software, hardware, firmware or a combination thereof. As a result, computer system 212 operates as a special purpose computer system in which task controller 214 in computer system 212 enables processing tasks for vehicles in real time as vehicles travel on a road. In particular, task controller 214 transforms computer system 212 into a special purpose computer system as compared to currently available general computer systems that do not have task controller 214.

In the illustrative example, the use of task controller 214 in computer system 212 integrates processes into a practical application performing tasks for vehicles in a manner that increases the performance of computer system 212 in performing these tasks. In other words, task controller 214 in computer system 212 is directed to a practical application of processes integrated into task controller 214 in computer system 212 that identify subtasks from a task for a vehicle and assigns those subtasks to Internet of Things nodes on possible paths that the vehicle may travel. In this illustrative example, task controller 214 in computer system 212 can ensure that resources are available to process the subtasks by having Internet of Things nodes available in each of the possible paths that the vehicle may travel. The different steps in the illustrative examples can ensure more efficient processing of tasks for vehicles traveling on a road in real time. In this manner, task controller 214 in computer system 212 provides a practical application of invention method processing tasks for a vehicle such that the functioning of computer system 212 is improved.

Thus, illustrative examples can identify subtasks from a task for a vehicle traveling on the road. The processing of the subtasks can be assigned to Internet of Things nodes on different paths and the assignment can be performed by many Internet of Things nodes to reduce latency and a need for greater processing power in individual Internet of Things nodes. With distribution of subtasks between Internet of Things nodes, parallel processing of subtasks can occur and also may reduce the impact on use of processing resources along the road.

The illustration of vehicle environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more vehicles in addition to vehicle 208 can be present on road 211. Task controller 214 can perform tasks in these vehicles through identifying some path in the tasks concerning those subtasks to Internet of Things nodes on the different possible paths from those vehicles on road 211. Further, task controller 214 can control the processing of tasks on other roads in addition to or in place of road 211.

Figure 3:
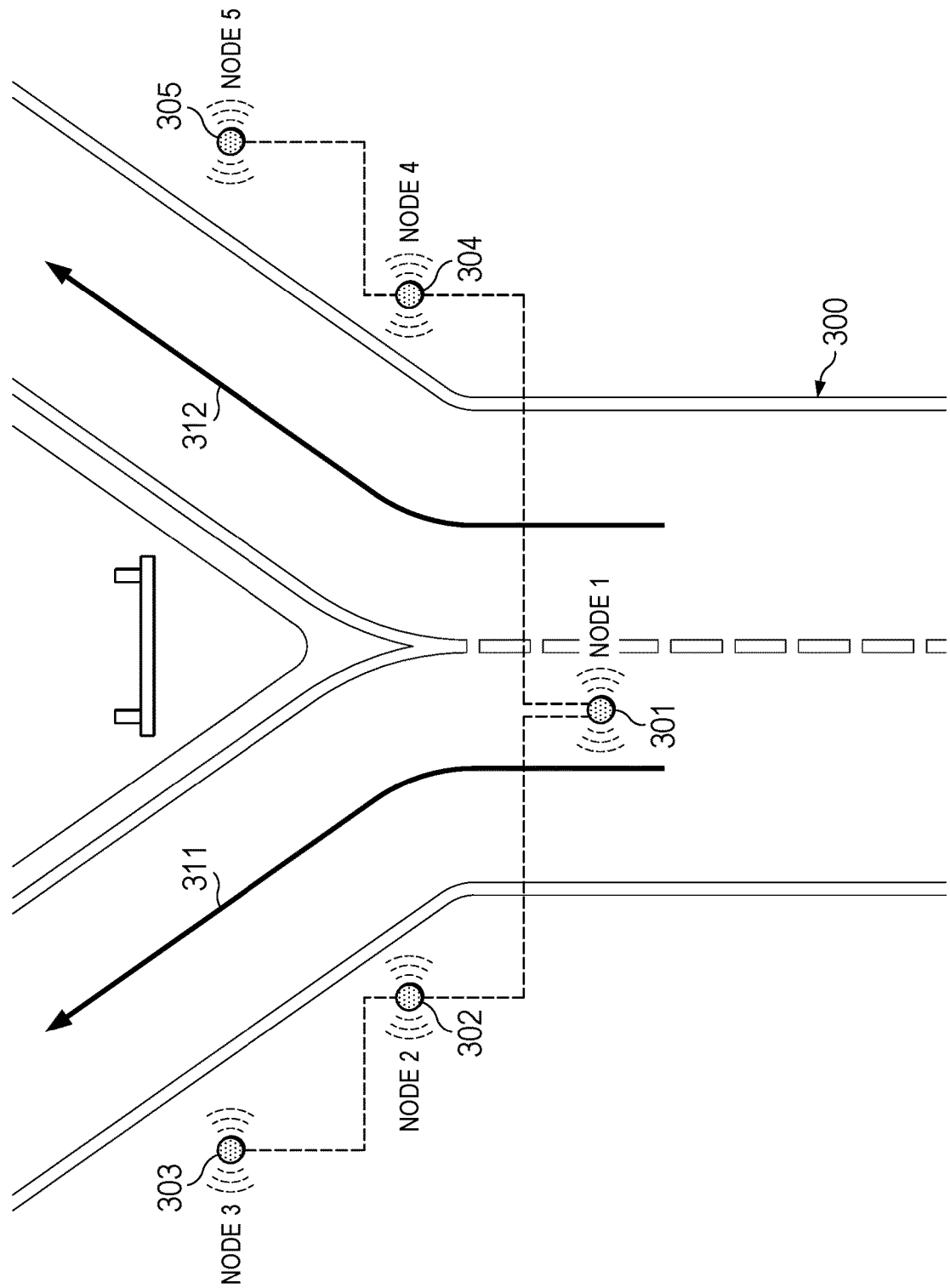
FIG. 3 is a diagram of a road with Internet of Things nodes in accordance with an illustrative embodiment.

Turning next to FIG. 3, a diagram of a road with Internet of Things nodes is depicted in accordance with an illustrative embodiment. In this illustrative example, road 300 is an example of an implementation for road 211 FIG. 2.

In this example, Internet of Things nodes are present along road 300. In this example, Internet of Things nodes comprise nodes 1 301, node 2 302, node 3 303, node 4 304, and node 5 305. As depicted, road 300 has path 311 and path 312.

Further in this example, these nodes can be, for example, roadside units, or other devices. In some cases, Internet of Things nodes can be embedded in the road. Nodes can be linked to each other in groups. As depicted in this example, a first group comprises node 1 301, node 2 302, and node 3 303. A second group comprises node 1 301, node 4 304, and node 5 305. In this example, node 1 301 is embedded in road 300 and can implement processes for task controller 214 or can receive instructions from task controller 214 FIG. 2. The other nodes are located along the side of road 300. Further, the other nodes can also implement processes from task controller 214. Nodes that are linked to each other can share information. This information can include information about the nodes such as processing resources, available sensors, and other information. Further, these nodes can also share results from processing subtasks. In some cases, the results from processing one subtask by one node can be used in processing another subtask in another node.

Figure 4:
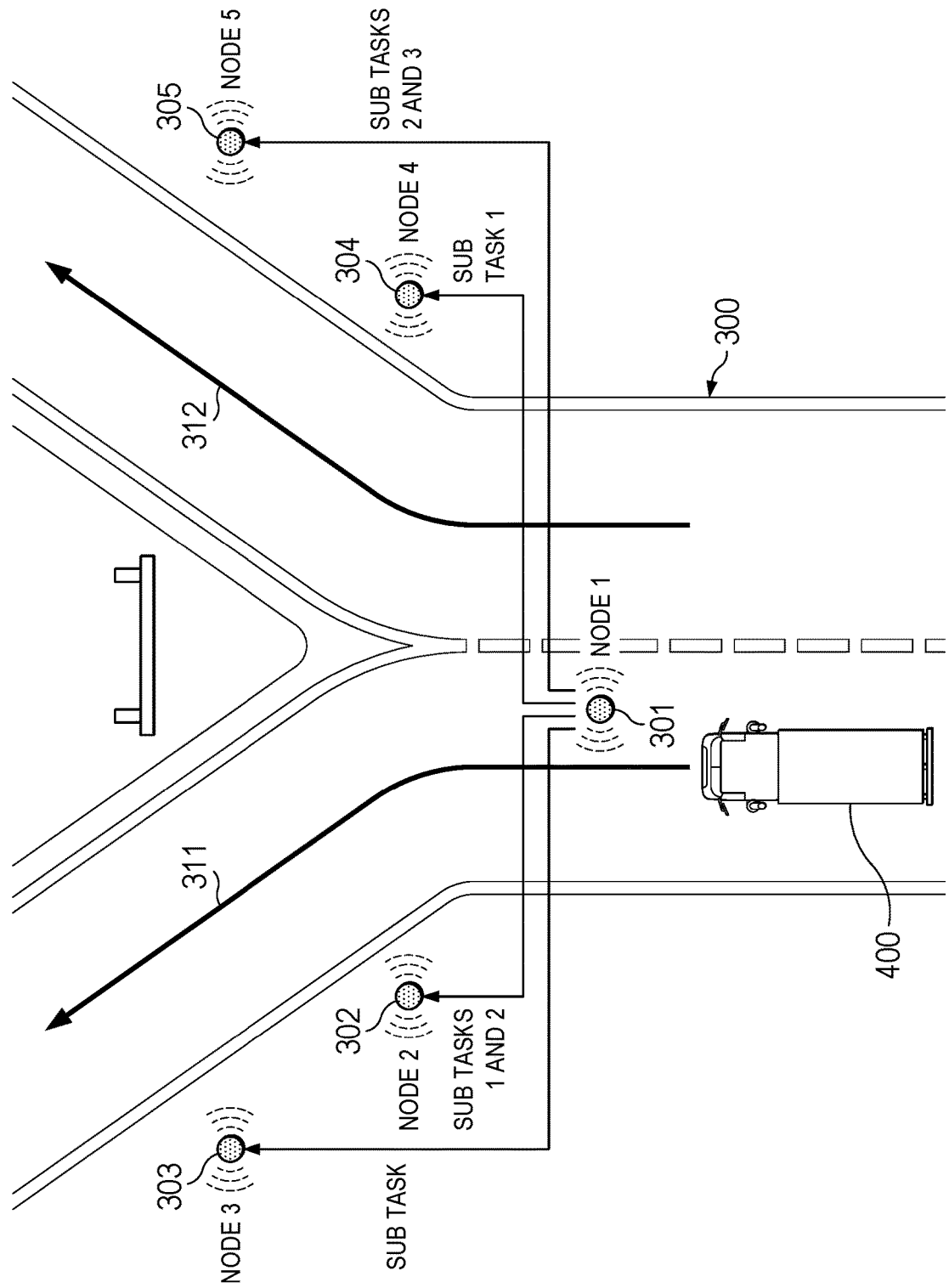
FIG. 4 is a diagram illustrating assigning subtasks for a task to Internet of Things nodes in points with an illustrative embodiment.

In FIG. 4, a diagram illustrating assigning subtasks for a task to Internet of Things nodes is depicted in points with an illustrative embodiment. In this figure, truck 400 travels on road 300. Truck 400 is detected by node 1 301. In this example, node 1 301 can divide a task for truck 400 into subtasks. In this example, the subtasks can be assigned to nodes on all possible paths that truck 400 can travel on road 300. In this example, two paths are present that truck 400 can take to travel on from the present location of truck 400. These are paths are path 311 and path 312.

In this illustrative example, the task for truck 400 is divided into three subtasks. Subtask 1 can be whether truck 400 is overloaded, subtask 2 can be whether the driver is in a condition to drive, and subtask 3 can be whether the registration number is clean.

Further in this illustrative example, node 1 301 can assign subtask 1 and subtask 2 to node 2 302 on path 311. Node 1 301 can assign subtask 3 to node 3 303 on path 311. For path 312, node 4 304 can be assigned subtask 1 and node 5 305 can be assigned subtask 2 and subtask 3. In this example, node 1 301 can assign subtasks to the nodes on each of the paths based on the processing resources available in the nodes as well as the processing resources needed by each of the subtasks. For example, node 2 302 and node 5 305 can be assigned to subtasks because these nodes may have greater processing resources as compared to node 3 303 and node 4 304.

In another illustrative example, node 1 301 can also process subtasks in addition to assigning subtasks. In this manner, the subtasks for the task or truck 400 can be performed regardless of the path selected by truck 400. In this manner, resources can be made available for processing subtasks along a path even though truck 400 has not selected a particular path.

Figure 5:
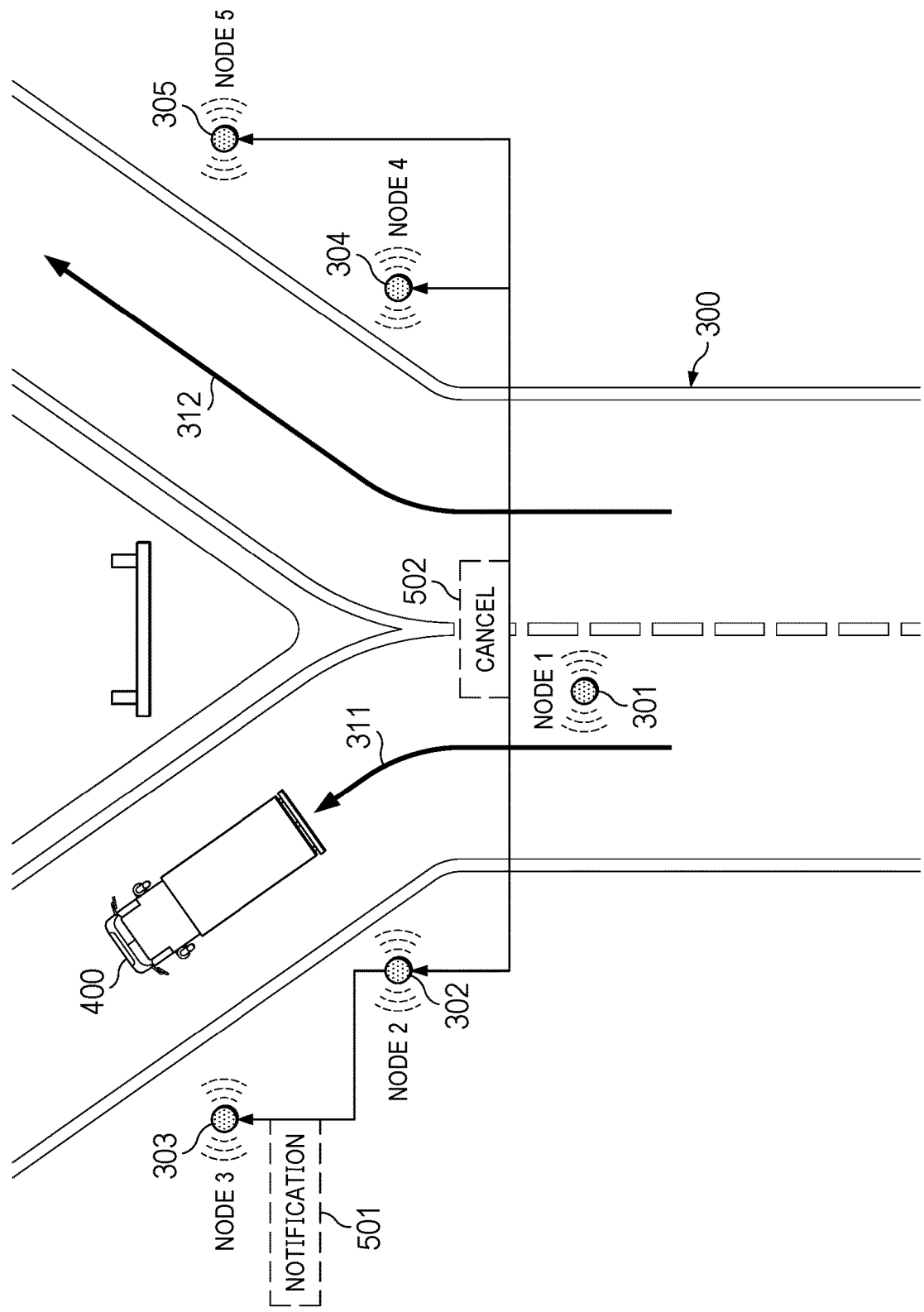
FIG. 5 is a diagram illustrating processing of subtasks based on a selected path traveled by a vehicle in accordance with an illustrative embodiment.

With reference now to FIG. 5, a diagram illustrating processing of subtasks based on a selected path traveled by a vehicle is depicted in accordance with an illustrative embodiment. As depicted in this figure, truck 400 travels on path 311 instead of path 312. In this example, node 2 302 detects the presence of truck 400 and begins processing the subtask 1 in the subtask 2.

Further, node 2 302 communicates with node 4 304 and node 5 305 and sends cancel notification 502 to cancel the subtasks to be performed for truck 400. In another illustrative example, node 2 302 can send a notification 501 to node 1 301 that node 2 302 has detected truck 400 and is processing subtask 1 and subtask 2. In this example, node 301 can send cancel notification 402 to node 4 304 and node 5 305 to cancel the subtasks assigned to those nodes. As a result, these nodes have processing resources that are now available for other processing such as subtasks for other vehicles.

Further in this example, when node 2 302 completes processing the subtask 1 in the subtask 2, those results can be sent to node 3 303. In some examples, node 3 303 may use a portion of those results in processing the subtask 3. In this example, node 2 302 completes processing subtask 1 and subtask 2 before truck 400 reaches node 3 300.

Also, one node can assign a portion of its tasks to the next node or nodes in the path traveled by truck 400. For example, node 2 302 can process subtasks one and assign subtask 2 to node 3 303. In this example, node 3 303 is a backup node for node to node 2 302. Reassignment of subtasks also can occur if node 2 302 is unable to complete processing all of the subtasks before truck 400 reaches node 3 303. In this case, node 3 can process both subtask 2 and subtask 3.

Figure 6:
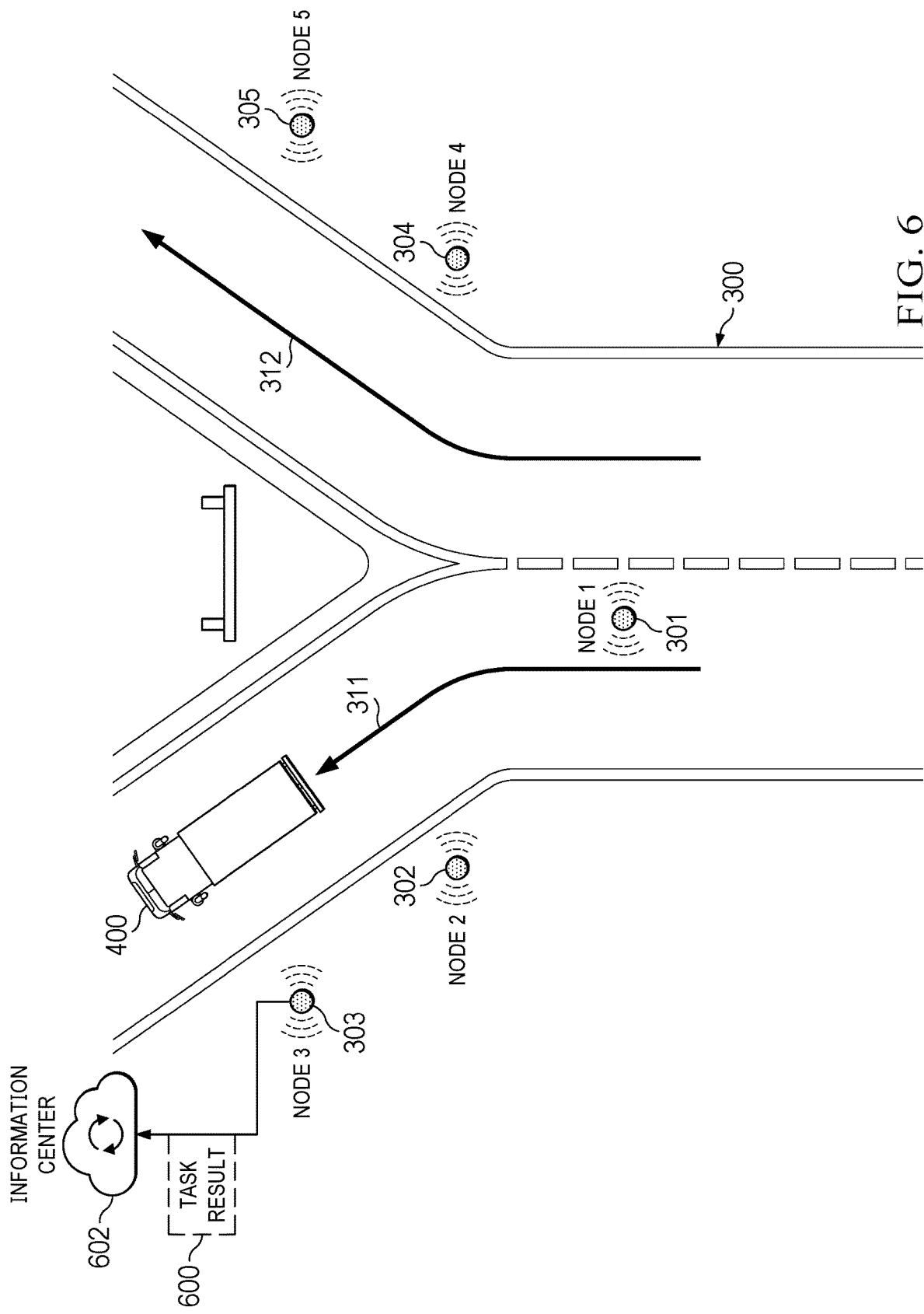
FIG. 6 is an illustration of transmitting results from completed subtasks in accordance with an illustrative embodiment.

Turning to FIG. 6, an illustration of transmitting results from completed subtasks is depicted in accordance with an illustrative embodiment. As depicted in this figure, truck 400 has reached node 3 303 on path 311. In this example, node 3 303 receives the results of subtasks processing from node 2 302. Node 3 303 combines the results from the processing of subtask 1, subtask 2, and subtask 3 to form task result 600. Node 3 303 sends task result 600 to information center 602 for at least one of storage or further processing. This example, information center 602 can be a cloud storage.

The illustration of processing a subtasks for vehicle depicted in FIGS. 4-6 is provided as an example of one illustrative example not meant to limit the manner in which other illustrative examples can be implemented. For example, in other illustrative examples, the road can have 2 paths from the branch. In yet other illustrative examples, additional branches and the road can be present.

Further, additional Internet of Things nodes can be present in addition to the 5 nodes depicted. For example, 10 nodes, 30 nodes, 32 nodes, or some other number of nodes can be present on the depicted portion of road 300. Additionally, other vehicles can also be present in addition to or in place of truck 400 from which tasks are divided into subtasks for processing by the nodes.

Figure 7:
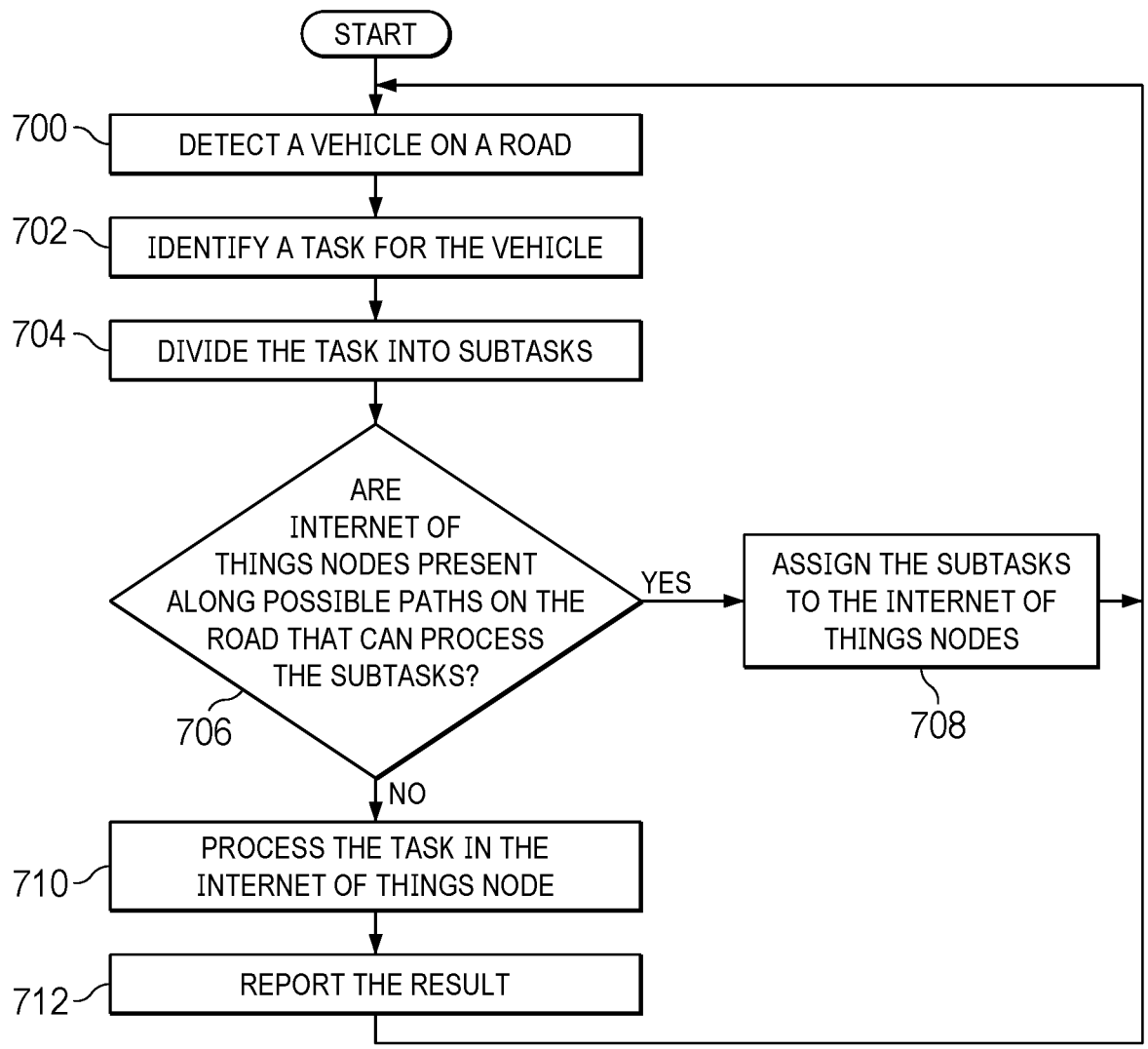
FIG. 7 is a flowchart of a process for processing a task for a vehicle in accordance with an illustrative embodiment.

With reference to FIG. 7, a flowchart of a process for processing a task for a vehicle is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in task controller 214 in FIG. 2 or implemented in an Internet of Things node such as node 1 301 in FIGS. 3-6.

The process begins by detecting a vehicle on a road (step 700). The process identifies a task for the vehicle (step 702). The process the task into subtasks (step 704). The process determines whether Internet of Things nodes along possible paths on the road are present that can process the subtasks (step 706). If Internet of Things nodes are present along the possible paths, the process assigns the subtasks to the Internet of Things nodes (step 708). The process then returns to step 700 to detect another vehicle.

With reference again to step 706, if Internet of Things nodes are not available to process the subtasks, the process processes the task in the Internet of Things node (step 710). The process reports the result (step 712). The process then proceeds to step 700 as described above.

Figure 8:
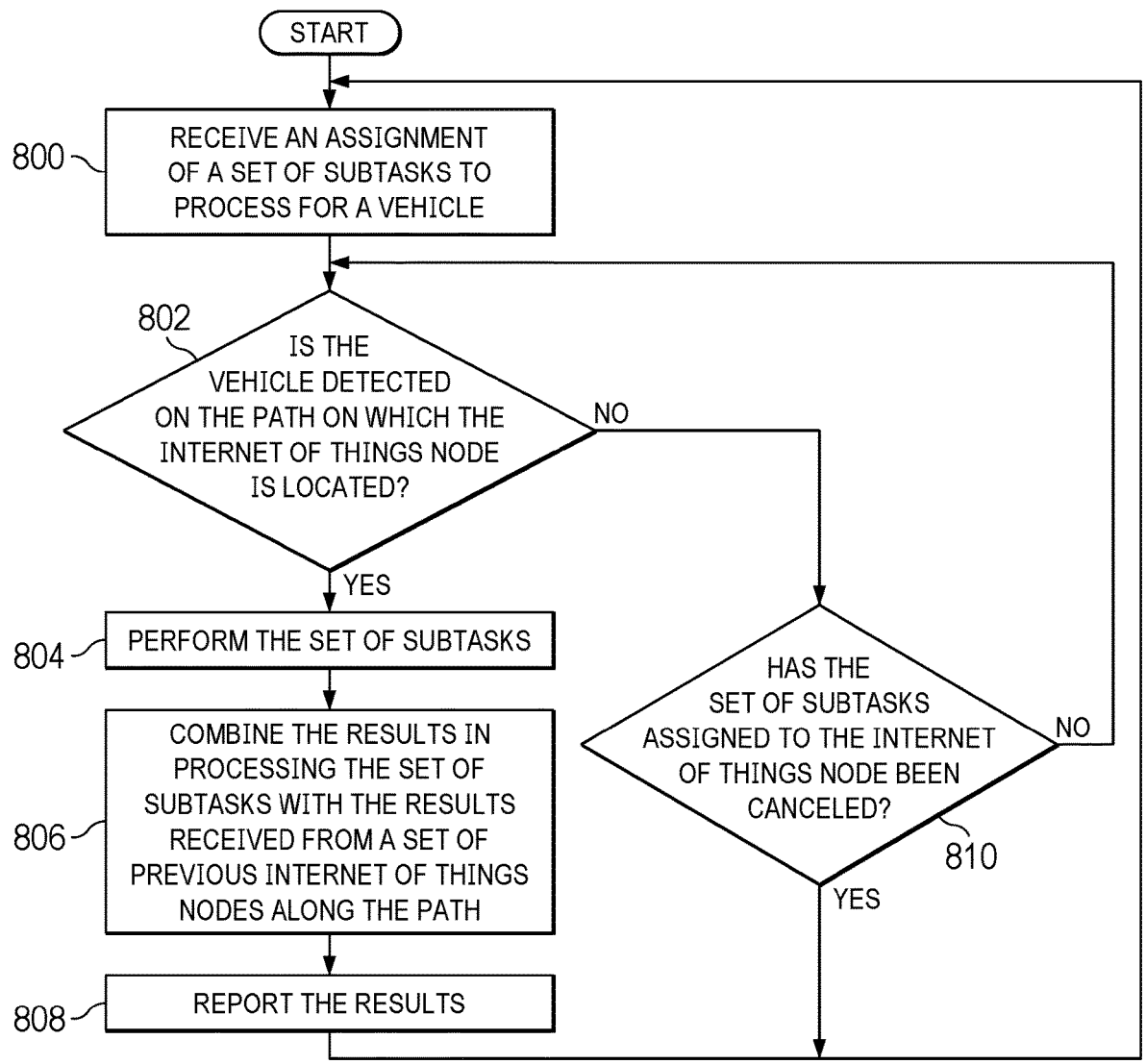
FIG. 8 is a flowchart of a process for processing a set of subtasks in accordance with an illustrative embodiment.

Next in FIG. 8, a flowchart of a process for processing a set of subtasks is depicted in accordance with an illustrative embodiment. This process can be implemented in an Internet of Things node to process one or more subtasks. For example, this process can be implemented in Internet of Things node 2 302 in FIGS. 3-6.

The process begins by receiving an assignment of a set of subtasks to process for a vehicle (step 800). This Internet of things node is on one of the possible paths that the vehicle can take. The process determines whether the vehicle is detected on the path on which the Internet of Things node is located (step 802).

If the vehicle is detected on the path on which the Internet of Things node, the process performs the set of subtasks (step 804). The process combines the results in processing the set of subtasks with the results received from a set of previous Internet of Things nodes along the path (step 806). In step 806, the results can be received directly from one or more previous Internet of Things nodes along the path that has process subtasks. In other illustrative examples, these results can be received from the vehicle. The process reports the results (step 808). In step 808 and results can be reported to another Internet of Things node directly or can be transmitted to the vehicle. The process then returns to step 800 to receive an assignment of additional subtasks.

With reference again to step 802, if the vehicle is not detected, a determination is made as to whether the set of subtasks assigned to the Internet of Things node has been canceled (step 810). The assignment of the set of subtasks can be canceled in response to the vehicle traveling along a path on which the Internet of Things node is not located.

If the set of subtasks has been canceled, the process returns to step 800 to receive another assignment of subtasks. Otherwise, the process returns to step 802.

Figure 9:
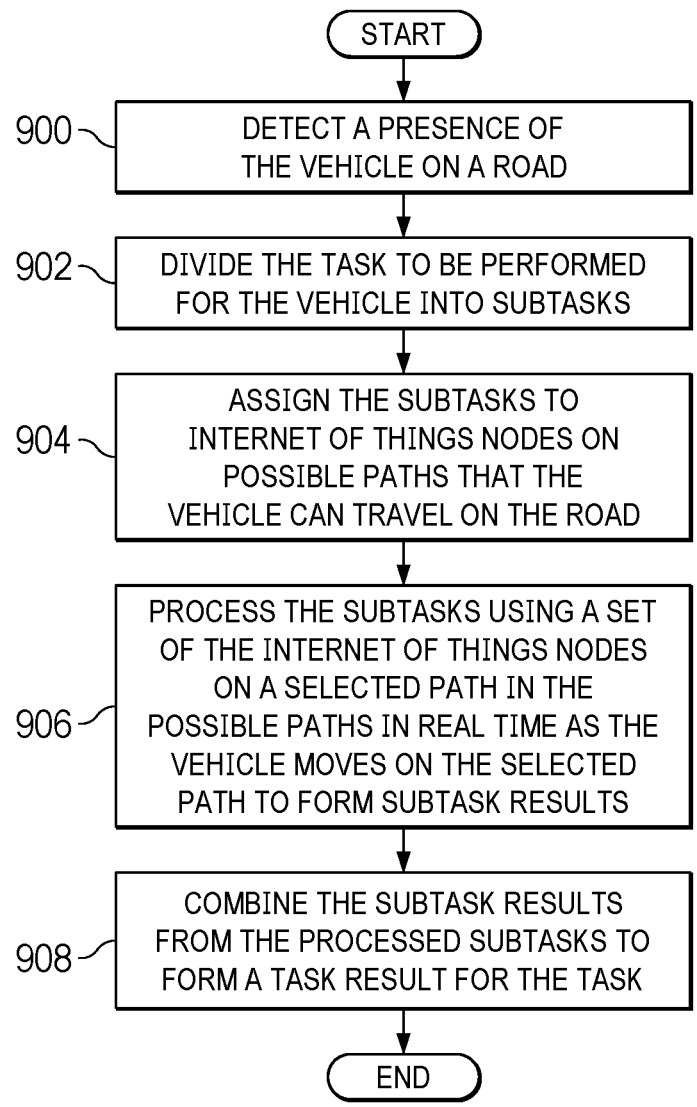
FIG. 9 is a flowchart of a process for performing a task in accordance with an illustrative embodiment.

With reference next to FIG. 9, a flowchart of a process for performing a task is depicted in accordance with an illustrative embodiment. The process in FIG. 9 can be implemented in hardware, software, or both. When implemented in software, the process can take the form of program instructions that are run by one of more processor units located in one or more hardware devices in one or more computer systems. For example, the process can be implemented in task controller 214 in computer system 212 of FIG. 2, which can perform the process using Internet of Things nodes.

The process begins by detecting a presence of the vehicle on a road (step 900). The process divides the task to be performed for the vehicle into subtasks (step 902).

The process assigns the subtasks to Internet of Things nodes on possible paths that the vehicle can travel on the road (step 904). The process processes the subtasks using a set of the Internet of Things nodes on a selected path in the possible paths in real time as the vehicle moves on the selected path to form subtask results (step 906).

The process combines the subtask results from the processed subtasks to form a task result for the task (step 908). The process terminates thereafter.

Figure 10:
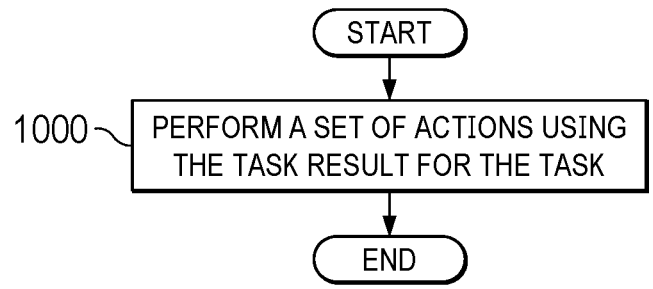
FIG. 10 is a flowchart of a process for a set of actions in accordance with an illustrative embodiment.

Turning to FIG. 10, a flowchart of process for a set of actions is depicted in accordance with an illustrative embodiment. The process in this flowchart is an example of an additional step that can be performed with the steps in FIG. 9.

The process performs a set of actions using the task result for the task (step 1000). The process terminates thereafter.

Figure 11:
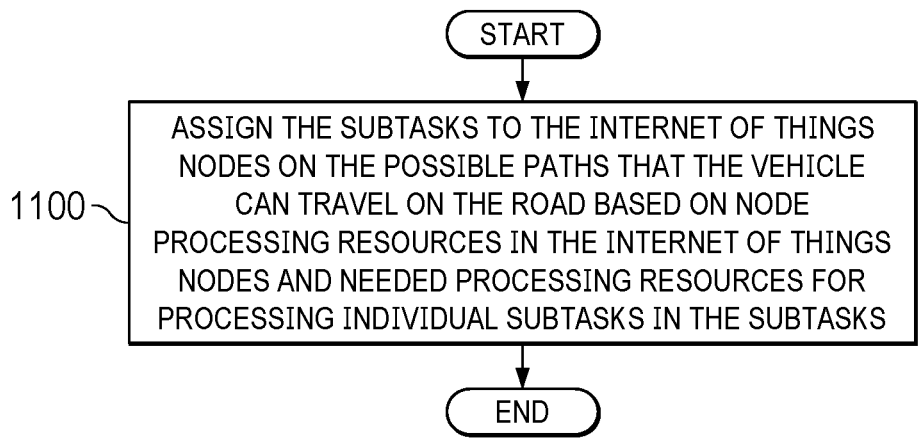
FIG. 11 is a flowchart of a process for assigning subtasks in accordance with an illustrative embodiment.

With reference to FIG. 11, a flowchart of a process for assigning subtasks is depicted in accordance with an illustrative embodiment. The process in FIG. 11 is an example of an implementation for step 904 in FIG. 9.

The process assigns the subtasks to the Internet of Things nodes on the possible paths that the vehicle can travel on the road based on node processing resources in the Internet of Things nodes and needed processing resources for processing individual subtasks in the subtasks (step 1100). The process terminates thereafter.

Figure 12:
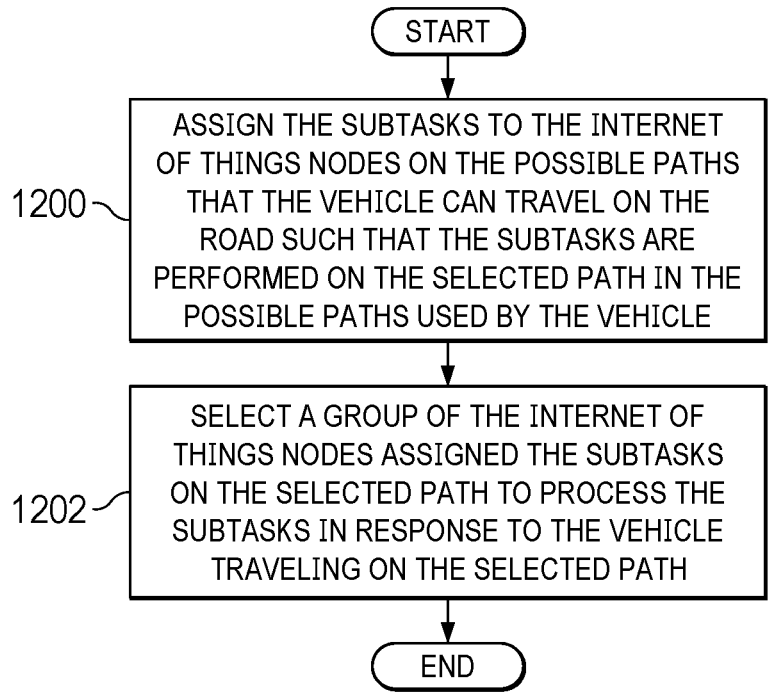
FIG. 12 is a flowchart of a process for assigning subtasks in accordance with an illustrative embodiment.

Next in FIG. 12, a flowchart of a process for assigning subtasks is depicted in accordance with an illustrative embodiment. The process in FIG. 12 is an example of an implementation for step 904 in FIG. 9.

The process assigns the subtasks to the Internet of Things nodes on the possible paths that the vehicle can travel on the road such that the subtasks are performed on the selected path in the possible paths used by the vehicle (step 1200). The process selects a group of the Internet of Things nodes assigned the subtasks on the selected path to process the subtasks in response to the vehicle traveling on the selected path (step 1202). The process terminates thereafter.

Figure 13:
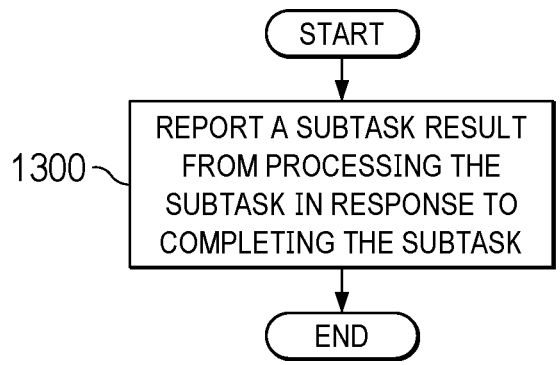
FIG. 13 is a flowchart of a process for assigning subtasks in accordance with an illustrative embodiment.

Turning to FIG. 13, a flowchart of a process for reporting results is depicted in accordance with an illustrative embodiment. The process in this figure is an example of an additional step that can be performed with the steps in FIG. 9. With this process, an Internet of Things node on the selected path completes a subtask assigned to the Internet of Things node by a time when the vehicle reaches a next Internet of Things node on the selected path.

The process reports a subtask result from processing the subtask in response to completing the subtask (step 1300). The process terminates thereafter. This reporting can be performed for subtasks completed by an Internet of Things node.

Figure 14:
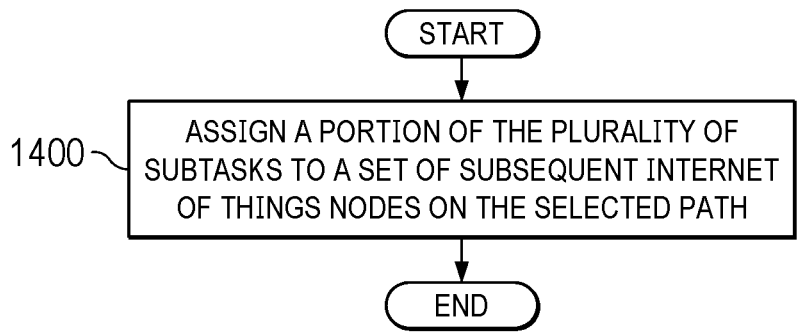
FIG. 14 is a flowchart of a process for reassigning tasks in accordance with an illustrative embodiment.

Turning to FIG. 14, a flowchart of a process for reassigning tasks is depicted in accordance with an illustrative embodiment. The process in this flowchart is an example of an additional step that can be performed with the steps in FIG. 9. In this process, an Internet of Things node in the Internet of Things nodes on the selected path is assigned a plurality of subtasks in the subtasks.

The process assigns a portion of the plurality of subtasks to a set of subsequent Internet of Things nodes on the selected path (step 1400). The process terminates thereafter. This reassignment of a portion of the subtasks can be performed when the Internet of Things node is unable to process all of the subtasks within a designated amount of time. For example, the time can be when the vehicle reaches the next Internet of Things node along the selected path traveled by the vehicle.

Figure 15:
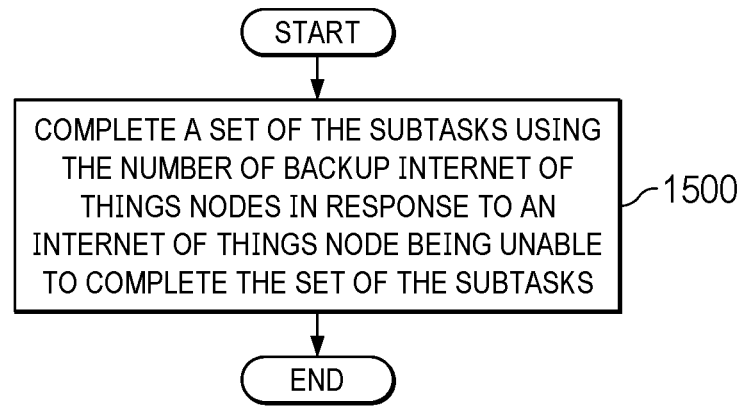
FIG. 15 is flowchart of a process for completing subtasks using backup Internet of Things nodes in accordance with an illustrative embodiment.

With reference next to FIG. 15, a flowchart of a process for completing subtasks using backup Internet of Things nodes is depicted in accordance with an illustrative embodiment. The process in this flowchart is an example of an additional step that can be performed with the steps in FIG. 9. In this flowchart, the Internet of Things nodes assign the subtasks including a number of backup Internet of Things nodes. These Internet of Things nodes can be designated as backups to perform the subtasks in case one or more of the Internet of Things nodes assigned to perform the subtasks are unable to perform or complete the subtasks.

The process completes a set of the subtasks using the number of backup Internet of Things nodes in response to an Internet of Things node being unable to complete the set of the subtasks (step 1500). The process terminates thereafter. In this example, the set of subtasks assemble all of the subtasks that were being performed by the Internet of Things node. In some cases, the backup Internet of Things node can receive partial results to complete processing of partially completed subtasks.

Figure 16:
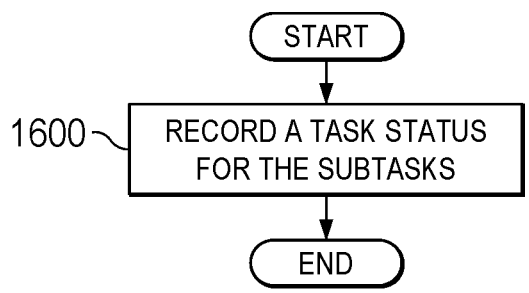
FIG. 16 is a flowchart of a process for recording task status in accordance with an illustrative embodiment.

Next in FIG. 16, a flowchart of a process for recording task status is depicted in accordance with an illustrative embodiment. The process in this figure is an example of an additional step that can be performed with the steps in FIG. 9.

The process records a task status for the subtasks (step 1600). The process terminates thereafter. This process can be initiated each time an Internet of Things node completes processing a subtask. The task status can indicate which subtasks have been performed, which subtasks have not been performed, the result of subtasks already completed, and other status information. In this example, the status can be recorded and passed on from one Internet of Things node to another Internet of Things node. In another example, the data status can be stored and maintained in the vehicle.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 17:
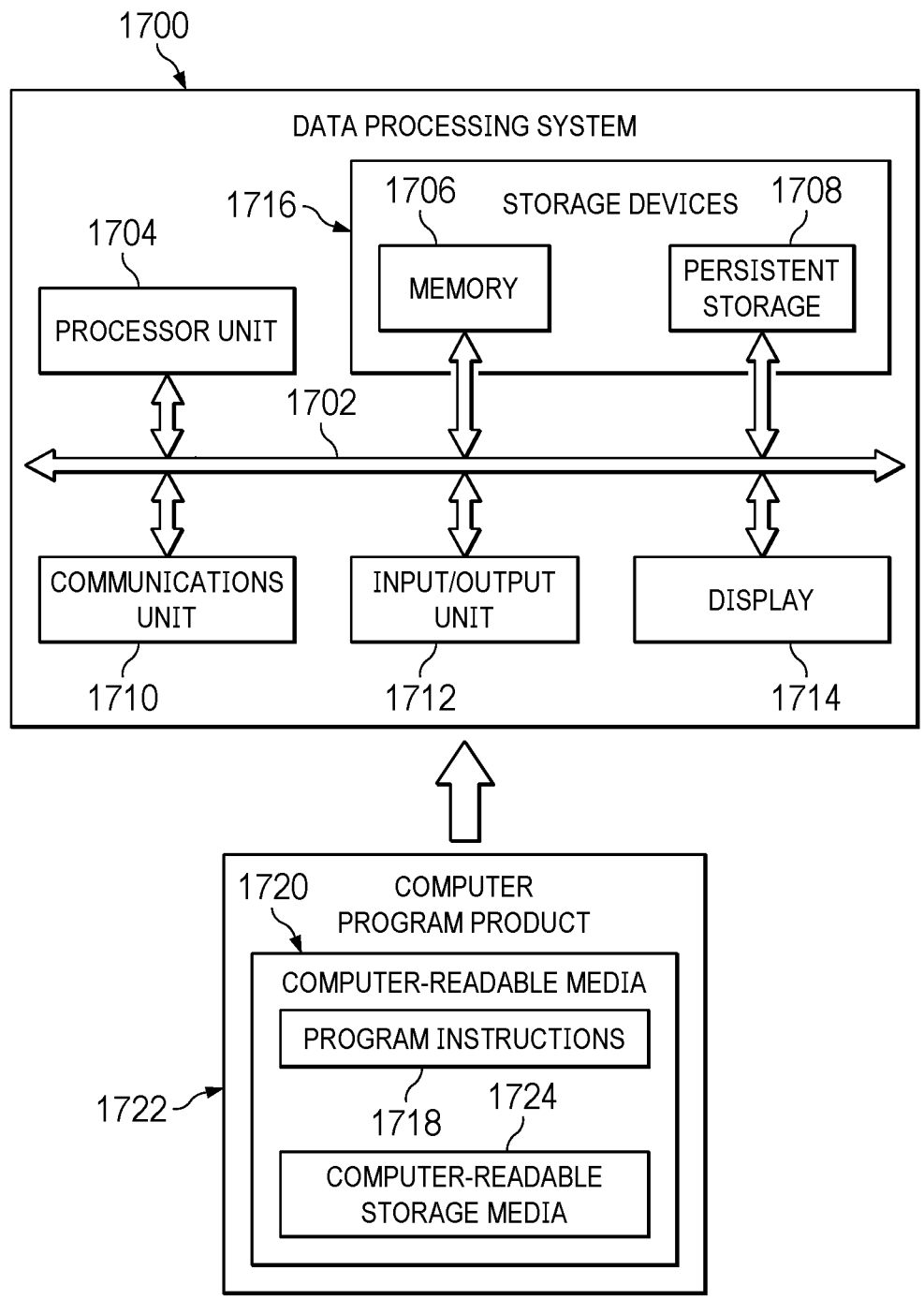
FIG. 17 is a block diagram of a data processing system in accordance with an illustrative embodiment.

Turning now to FIG. 17, a block diagram of a data processing system is depicted in accordance with an illustrative embodiment. Data processing system 1700 can be used to implement computers and computing devices in computing environment 100 in FIG. 1. Data processing system 1700 can also be used to implement computer system 212 in FIG. 2. In this illustrative example, data processing system 1700 includes communications framework 1702, which provides communications between processor unit 1704, memory 1706, persistent storage 1708, communications unit 1710, input/output (I/O) unit 1712, and display

1714. In this example, communications framework 1702 takes the form of a bus system.

Processor unit 1704 serves to execute instructions for software that can be loaded into memory 1706. Processor unit 1704 includes one or more processors. For example, processor unit 1704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1704 can be implemented using one or more heterogeneous processor systems in which a main processor is present with secondary processors on a single chip. As another illustrative example, processor unit 1704 can be a symmetric multi-processor system containing multiple processors of the same type on a single chip.

Memory 1706 and persistent storage 1708 are examples of storage devices 1716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1716 may also be referred to as computer readable storage devices in these illustrative examples. Memory 1706, in these examples, can be, for example, a random-access memory or any other suitable volatile or non-volatile storage device. Persistent storage 1708 may take various forms, depending on the particular implementation.

For example, persistent storage 1708 may contain one or more components or devices. For example, persistent storage 1708 can be a hard drive, a solid-state drive (SSD), a flash memory, a rewritable optical disk, a rewritable magnetic tape, or some combination of the above. The media used by persistent storage 1708 also can be removable. For example, a removable hard drive can be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that can be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs can be located in storage devices 1716, which are in communication with processor unit 1704 through communications framework 1702. The processes of the different embodiments can be performed by processor unit 1704 using computer-implemented instructions, which may be located in a memory, such as memory 1706.

These instructions are referred to as program instructions, computer usable program instructions, or computer readable program instructions that can be read and executed by a processor in processor unit 1704. The program instructions in the different embodiments can be embodied on different physical or computer readable storage media, such as memory 1706 or persistent storage 1708.

Program instructions 1718 are located in a functional form on computer readable media 1720 that is selectively removable and can be loaded onto or transferred to data processing system 1700 for execution by processor unit 1704. Program instructions 1718 and computer readable media 1720 form computer program product 1722 in these illustrative examples. In the illustrative example, computer readable media 1720 is computer readable storage media 1724.

Computer readable storage media 1724 is a physical or tangible storage device used to store program instructions 1718 rather than a medium that propagates or transmits program instructions 1718. Computer readable storage media 1724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1718 can be transferred to data processing system 1700 using a computer readable signal media. The computer readable signal media are signals and can be, for example, a propagated data signal containing program instructions 1718. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1720" can be singular or plural. For example, program instructions 1718 can be located in computer readable media 1720 in the form of a single storage device or system. In another example, program instructions 1718 can be located in computer readable media 1720 that is distributed in multiple data processing systems. In other words, some instructions in program instructions 1718 can be located in one data processing system while other instructions in program instructions 1718 can be located in one data processing system. For example, a portion of program instructions 1718 can be located in computer readable media 1720 in a server computer while another portion of program instructions 1718 can be located in computer readable media 1720 located in a set of client computers.

The different components illustrated for data processing system 1700 are not meant to provide architectural limitations to the manner in which different embodiments can be implemented. In some illustrative examples, one or more of the components may be incorporated in or otherwise form a portion of, another component. For example, memory 1706, or portions thereof, may be incorporated in processor unit 1704 in some illustrative examples. The different illustrative embodiments can be implemented in a data processing system including components in addition to or in place of those illustrated for data processing system 1700. Other components shown in FIG. 17 can be varied from the illustrative examples shown. The different embodiments can be implemented using any hardware device or system capable of running program instructions 1718.

Thus, illustrative embodiments a computer implemented method, computer system, and computer program product for performing a task for a vehicle. In one illustrative example, a computer implemented method for performs a task for a vehicle. A number of processor units detects a presence of the vehicle on a road. The number of processor units divides the task to be performed for the vehicle into subtasks. The number of processor units assigns the subtasks to Internet of Things nodes on possible paths that the vehicle can travel on the road. The number of processor units processes the subtasks using a set of the Internet of Things nodes on a selected path in the possible paths in real time as the vehicle moves on the selected path to form subtask results. The number of processor units combines the subtask results from the processed subtasks to form a task result for the task.

Thus, illustrative examples can identify subtasks from a task for a vehicle traveling on the road. The processing of the subtasks can be assigned to Internet of Things nodes on different paths. The assignment can be performed by many Internet of Things nodes to reduce latency and a need for greater processing power in the Internet of Things nodes. With distribution of subtasks between Internet of Things nodes, parallel processing of subtasks can occur and also may reduce the impact on use of processing resources along the road.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for performing a task for a vehicle, the computer implemented method comprising:
    receiving, by a task controller, an indication of a presence of the vehicle on a road;
    dividing, by the task controller, the task to be performed for the vehicle into subtasks;
    determining, by the task controller, node processing resources available at each Internet of Things node along possible paths that the vehicle can travel on the road;
    determining, by the task controller, needed processing resources for processing individual subtasks in the subtasks;
    assigning, by the task controller, the subtasks to Internet of Things nodes on possible paths that the vehicle can travel on the road based on matching the node processing resources with the needed processing resources for the individual subtasks;
    receiving, by the task controller, subtask results from a set of the Internet of Things nodes on a selected path in the possible paths in real time as the vehicle moves on the selected path, wherein at least one Internet of Things node on the selected path completes an assigned subtask by reassigning a portion of the subtask to a subsequent Internet of Things node on the selected path when the at least one Internet of Things node determines it lacks sufficient processing capacity to complete all assigned subtasks before the vehicle reaches a next Internet of Things node; and
    combining the subtask results to form a task result for the task.

2. The computer implemented method of claim 1 further comprising:
    performing, by the task controller, a set of actions using the task result for the task.

3. The computer implemented method of claim 1, wherein assigning, by the task controller, the subtasks to the Internet of Things nodes on the possible paths that the vehicle can travel on the road comprises:
    assigning, by the task controller, the subtasks to the Internet of Things nodes on the possible paths that the vehicle can travel on the road based on node processing resources in the Internet of Things nodes and needed processing resources for processing individual subtasks in the subtasks.

4. The computer implemented method of claim 1, wherein assigning, by the task controller, the subtasks to the Internet of Things nodes on the possible paths that the vehicle can travel on the road further comprises:
    assigning, by the task controller, the subtasks to the Internet of Things nodes on the possible paths that the vehicle can travel on the road such that the subtasks are performed on the selected path in the possible paths used by the vehicle; and
    selecting, by the task controller, a group of the Internet of Things nodes assigned the subtasks on the selected path to process the subtasks in response to the vehicle traveling on the selected path.

5. The computer implemented method of claim 1, wherein an Internet of Things node in the selected path completes a subtask assigned to the Internet of Things node by a time when the vehicle reaches a next Internet of Things node on the selected path and further comprising:
    sending a subtask result from processing the subtask in response to completing the subtask to the task controller.

6. The computer implemented method of claim 1, wherein the Internet of Things nodes assigned the subtasks include a number of backup Internet of Things nodes and further comprising:
    completing a set of the subtasks using the number of backup Internet of Things nodes in response to an Internet of Things node being unable to complete the set of the subtasks.

7. The computer implemented method of claim 1 further comprising:
    recording a task status for the subtasks.

8. The computer implemented method of claim 1 further comprising:
    receiving, via the task controller, a subtask result from an Internet of Things node in the selected path that completes a subtask assigned to the Internet of Things node by a time when the vehicle reaches a next Internet of Things node on the selected path.

9. A computer system comprising:
a plurality of processors;
a memory storing program instructions; and
a network interface;
  wherein the program instructions, when executed by at least one processor in the plurality of processors, configure the computer system to implement a task controller that performs operations comprising:
  receiving via the network interface, an indication of a presence of a vehicle on a road;
  dividing a task to be performed for the vehicle into subtasks;
  determining node processing resources available at each Internet of Things node along possible paths that the vehicle can travel on the road;
  determining needed processing resources for processing individual subtasks in the subtasks;
  transmitting, via the network interface, assignments of the subtasks to Internet of Things nodes on possible paths that the vehicle can travel on the road based on matching the node processing resources with the needed processing resources for the individual subtasks;
  receiving, via the network interface, subtask results from a set of the Internet of Things nodes on a selected path in the possible paths in real time as the vehicle moves on the selected path, wherein at least one Internet of Things node on the selected path completes an assigned subtask by reassigning a portion of the subtask to a subsequent Internet of Things node on the selected path when the at least one Internet of Things node determines it lacks sufficient processing capacity to complete all assigned subtasks before the vehicle reaches a next Internet of Things node; and
  combining the subtask results to form a task result for the task.

10. The computer system of claim 9, wherein the operations further comprise:
  performing a set of actions using the task result for the task.

11. The computer system of claim 9, wherein transmitting the assignments of the subtasks comprises:
  determining the node processing resources in the Internet of Things nodes and needed processing resources for processing individual subtasks in the subtasks; and
generating the assignments of the subtasks to the Internet of Things nodes on the possible paths based on the determined processing resources.

12. The computer system of claim 9, wherein transmitting the assignments of the subtasks comprises:
  assigning the subtasks to the Internet of Things nodes on the possible paths such that the subtasks are performed on the selected path in the possible paths used by the vehicle; and
  transmitting, via the network interface, a selection message to a group of the Internet of Things nodes assigned the subtasks on the selected path to process the subtasks in response to the vehicle traveling on the selected path.

13. The computer system of claim 9, wherein the operations further comprises:
  recording a tasks status for the subtasks.

14. The computer system of claim 9, wherein the operations further comprise:
  receiving, via the network interface, a subtask result from an Internet of Things node in the selected path that completes a subtask assigned to the Internet of Things node by a time when the vehicle reaches a next Internet of Things node on the selected path.

15. The computer system of claim 9, wherein the operations further comprise:
  receiving, via the network interface, a notification that an Internet of Things node in the Internet of Things nodes on the selected path has reassigned a portion of a plurality of subtasks assigned to the Internet of Things node to a set of subsequent Internet of Things nodes on the selected path.

16. The computer system of claim 9, wherein the operations further comprise:
  detecting, via the network interface, a failure of an Internet of Things node to complete an assigned subtask; and transmitting, via the network interface, instructions to a backup Internet of Things node to complete the assigned subtask.

17. A computer program product for performing a task for a vehicle, the computer program product comprising a computer readable storage medium having program instructions embodied therewith, the program instructions executable by a computer system to cause the computer system to:
  receive, by a task controller, a presence of the vehicle on a road;
  divide, by the task controller, the task to be performed for the vehicle into subtasks;
  determine node processing resources available at each Internet of Things node along possible paths that the vehicle can travel on the road;
  determine needed processing resources for processing individual subtasks in the subtasks;
  assign, by the task controller, the subtasks to Internet of Things nodes on possible paths that the vehicle can travel on the road based on matching the node processing resources with the needed processing resources for the individual subtasks;
  receive, by the task controller, the subtask results from a set of the Internet of Things nodes on a selected path in the possible paths in real time as the vehicle moves on the selected path, wherein at least one Internet of Things node on the selected path completes an assigned subtask by reassigning a portion of the subtask to a subsequent Internet of Things node on the selected path when the at least one Internet of Things node determines it lacks sufficient processing capacity to complete all assigned subtasks before the vehicle reaches a next Internet of Things node;
and
  combine subtask results to form a task result for the task.

18. The computer program product of claim 17, wherein the task controller cause the computer system to:
  perform a set of actions using the task result for the task.

19. The computer program product of claim 17, wherein in assigning the subtasks to the Internet of Things nodes on the possible paths that the vehicle can travel on the road, the task controller cause the computer system to:
  assign the subtasks to the Internet of Things nodes on the possible paths that the vehicle can travel on the road based on node processing resources in the Internet of Things nodes and needed processing resources for processing individual subtasks in the subtasks.

20. The computer program product of claim 17, wherein in assigning the subtasks to the Internet of Things nodes on the possible paths that the vehicle can travel on the road, the task controller cause the computer system to:
  assign the subtasks to the Internet of Things nodes on the possible paths that the vehicle can travel on the road such that the subtasks are performed on the selected path in the possible paths used by the vehicle; and select a group of the Internet of Things nodes assigned the subtasks on the selected path to process the subtasks in response to the vehicle traveling on the selected path.

\* \* \* \* \*